(12) United States Patent
Lee et al.

(10) Patent No.: US 12,111,294 B2
(45) Date of Patent: Oct. 8, 2024

(54) 360 DEGREE FOLDING JIG

(71) Applicant: FlexiGO INC., Cheonan-si (KR)

(72) Inventors: Ki Yong Lee, Cheonan-si (KR); Seong Woo Kim, Cheonan-si (KR); Ho Moon You, Cheongju-si (KR)

(73) Assignee: FlexiGO INC., Cheonan-si (KR)

( * ) Notice: Subject to any disclaimer, the term of this patent is extended or adjusted under 35 U.S.C. 154(b) by 259 days.

(21) Appl. No.: 17/868,736

(22) Filed: Jul. 19, 2022

(65) Prior Publication Data

US 2023/0236098 A1    Jul. 27, 2023

(30) Foreign Application Priority Data

Jan. 27, 2022  (KR) .................. 10-2022-0012120
Jul. 13, 2022  (KR) .................. 10-2022-0086281

(51) Int. Cl.
*G01N 3/20*    (2006.01)

(52) U.S. Cl.
CPC ....... *G01N 3/20* (2013.01); *G01N 2203/0023* (2013.01)

(58) Field of Classification Search
CPC ..................................................... G01N 3/20
See application file for complete search history.

(56) References Cited

U.S. PATENT DOCUMENTS

| | | | |
|---|---|---|---|
| 2019/0154555 A1* | 5/2019 | Han | G01N 3/04 |
| 2019/0293535 A1* | 9/2019 | Lee | G01N 3/02 |
| 2019/0391058 A1* | 12/2019 | Lee | G01N 3/04 |
| 2020/0032952 A1* | 1/2020 | Han | H04B 1/3888 |
| 2020/0400541 A1* | 12/2020 | Levesque | G01N 3/20 |
| 2021/0348995 A1* | 11/2021 | Kim | G01N 3/20 |
| 2022/0042891 A1* | 2/2022 | Lee | G01N 3/02 |
| 2023/0358653 A1* | 11/2023 | Lee | G06F 1/1641 |

FOREIGN PATENT DOCUMENTS

| | | |
|---|---|---|
| JP | 3166045 U | 2/2011 |
| KR | 10-2019-0083805 A | 7/2019 |
| KR | 10-2255147 B1 | 5/2021 |

OTHER PUBLICATIONS

English Translation of KR 1020190083805 (Year: 2019).*
English Translation of JP 3166045 (Year: 2011).*

* cited by examiner

*Primary Examiner* — Alexander A Mercado
(74) *Attorney, Agent, or Firm* — United One Law Group LLC; Kongsik Kim; Jhongwoo Peck

(57) ABSTRACT

A 360 degree folding jig performs actions similar to those of a product to which a sample is applied when conducting a durability test for the sample. The 360 degree folding jig includes a fixed plate module on which one side of a sample is supported, a folding plate module that is spaced apart from the fixed plate module and on which the other side of the sample is supported so as to be reciprocally movable, and a pair of rotation support modules respectively provided at each end of the mutually adjacent fixed plate module and the folding plate module, and configured to couple the folding plate module to the fixed plate module so that the folding plate module is in-folded or out-folded.

5 Claims, 7 Drawing Sheets

360 DEGREE FOLDING JIG

CROSS REFERENCE TO RELATED APPLICATIONS

The present application claims priority to Korean Application No. 10-2022-0012120 filed on Jan. 27, 2022, and Korean Application No. 10-2022-0086281 filed on Jul. 13, 2022, which applications are incorporated herein by reference in their entireties.

BACKGROUND

1. Field of the Invention

The present disclosure relates to a 360 degree folding jig and, more particularly, to a 360 degree folding jig designed to perform actions similar to those of a product to which a sample is applied when conducting a durability test for the sample.

2. Description of the Related Art

In general, conventional display panels used for displays such as those in televisions, computer monitors, and various portable electronic devices are made of a non-flexible glass substrate, so they are bland, have a flat structure, and have limitations in their application.

However, in recent years, thanks to the development of science and technology, instead of a non-flexible glass substrate, devices that utilize a flexible display that can be bent by using flexible materials such as plastics have been developed and produced. For example, technology for a flexible display panel that can be folded or rolled up like a scroll is also being developed.

As such, as in-folding and out-folding products, as well as 360 degree foldable products are released, it is necessary to develop a jig that can realize in-folding, out-folding, and 360 degree folding test among durability test jigs.

DOCUMENTS OF RELATED ART

Patent Documents (Patent Document 0001) Korean Patent No. 10-2255147 (May 24, 2021, Invention Title: "DEVICE FOR EVALUATING 360 DEGREE BI-DIRECTIONAL FOLDING DURABILITY OF FLEXIBLE MATERIAL")

SUMMARY

Accordingly, the present disclosure has been made keeping in mind the above problems occurring in the related art, and the present disclosure is intended to provide a 360 degree folding jig designed to perform actions similar to those of a product to which a sample is applied when conducting a durability test for the sample.

In order to achieve the above objective, according to an embodiment of the present disclosure, there is provided a 360 degree folding jig including: a fixed plate module on which a first side of a sample is supported; a folding plate module that is spaced apart from the fixed plate module and on which a second side of the sample is supported so as to be reciprocally movable; and a pair of rotation support modules respectively provided at each end of the mutually adjacent fixed plate module and the folding plate module, and configured to couple the folding plate module to the fixed plate module so that the folding plate module is in-folded or out-folded.

The rotation support module may be provided with: a first shaft forming an axis of rotation of the folding plate module based on the rotation support module; and a second shaft that is spaced apart from the first shaft toward the fixed plate module and forms an axis of rotation of the rotation support module based on the fixed plate module, and the rotation support module may rotate on the basis of the fixed plate module in connection with a rotation of the folding plate module based on the rotation support module when the folding plate module is in-folded or out-folded on the basis of the fixed plate module.

The folding plate module may include: a guide panel to which the rotation support modules are coupled to each end in a state spaced apart from the fixed plate module, and provided with a reciprocating guide along a moving direction perpendicular to an imaginary line connecting a pair of rotation support modules; a reciprocating slider arranged to be reciprocally movable on the reciprocating guide; a reciprocating member coupled to the reciprocating slider from the first side of the guide panel and supporting the second side of the sample; and a reciprocating support member coupled to the reciprocating slider from the second side of the guide panel.

The folding plate module may further include: an elastic member for elastically decompressing the reciprocating slider to a front of the moving direction on the basis of the guide panel, while elastically decompressing the reciprocating slider to a rear of the moving direction on the basis of the guide panel.

In the guide panel, a member seating part on which the elastic member may be movably seated is formed recessed.

The rotation support module may include: a mounting bracket disposed at each end of the fixed plate module and the folding plate module adjacent to each other; a fixed support member having the first side coupled to the fixed plate module, and the second side rotatably coupled to the mounting bracket with the second shaft as a medium; a fixed gear shaft rotatably coupling the fixed support member to the mounting bracket to perform the second shaft; a folding support member having the first side coupled to the folding plate module, and the second side rotatably coupled to the mounting bracket with the first shaft as a medium; and a folding gear shaft rotatably coupling the folding support member to the mounting bracket to perform the first shaft. At this time, the fixed support member may be gear-coupled to the folding support member.

The fixed support member may include: a fixed joint part coupled to the folding plate module; and a fixed gear part provided at an end of the fixed joint part and rotatably coupled to the mounting bracket via the fixed gear shaft, and the folding support member may include: a folding joint part coupled to the fixed plate module; and a folding gear part provided at an end of the folding joint part and rotatably coupled to the mounting bracket via the folding gear shaft. At this time, the fixed gear part and the folding gear part may be mutually gear-coupled.

As described above, the 360 degree folding jig of the present disclosure can perform actions similar to those of a product to which a sample is applied when conducting a durability test for the sample.

In addition, the 360 degree folding jig of the present disclosure can clearly perform an in-folding action, an out-folding action, and a 360 degree folding action through the interconnected rotation action between the fixed plate module, the folding plate module, and the rotation support module.

Furthermore, the 360 degree folding jig of the present disclosure can facilitate the reciprocating motion of the reciprocating slider, the reciprocating member, and the reciprocating support member based on the guide panel through the detailed coupling relationship of the folding plate module. Also, the stress-free condition can be realized for the stress acting on the sample.

Moreover, the 360 degree folding jig of the present disclosure ensures smooth reciprocating motion of the reciprocating slider, the reciprocating member, and the reciprocating support member based on the guide panel through the additional coupling relationship of the elastic member, and realizes stress-free condition for the stress acting on the sample.

In addition, the 360 degree folding jig of the present disclosure can stably guide the reciprocating motion of the reciprocating member and the reciprocating support member in the guide panel through the guide seating part, and can minimize the movement of the reciprocating member and the reciprocating support member in the guide panel.

Furthermore, the 360 degree folding jig of the present disclosure can prevent the elastic member from being interfered with the reciprocating member and the reciprocating support member by using the member seating part.

Moreover, the 360 degree folding jig of the present disclosure can position the elastic member in the guide panel by using the elastic joint part.

In addition, the 360 degree folding jig of the present disclosure can clarify the mutual linkage action between the fixed plate module, the folding plate module, and the rotation support module through the detailed coupling relationship of the rotation support module, and can realize stress-free condition for the stress acting on the sample.

Furthermore, the 360 degree folding jig of the present disclosure can clearly perform the linked rotation action of the rotation support module and the folding plate module based on the fixed plate module through the gear coupling structure between the fixed support member and the folding support member.

Moreover, the 360 degree folding jig of the present disclosure can stably couple the fixed gear shaft to the mounting bracket by using the fixed shaft support, and prevent the fixed gear shaft from being separated from the mounting bracket.

Furthermore, the 360 degree folding jig of the present disclosure can stably couple the folding gear shaft to the mounting bracket by using the folding shaft support, and prevent the folding gear shaft from being separated from the mounting bracket.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
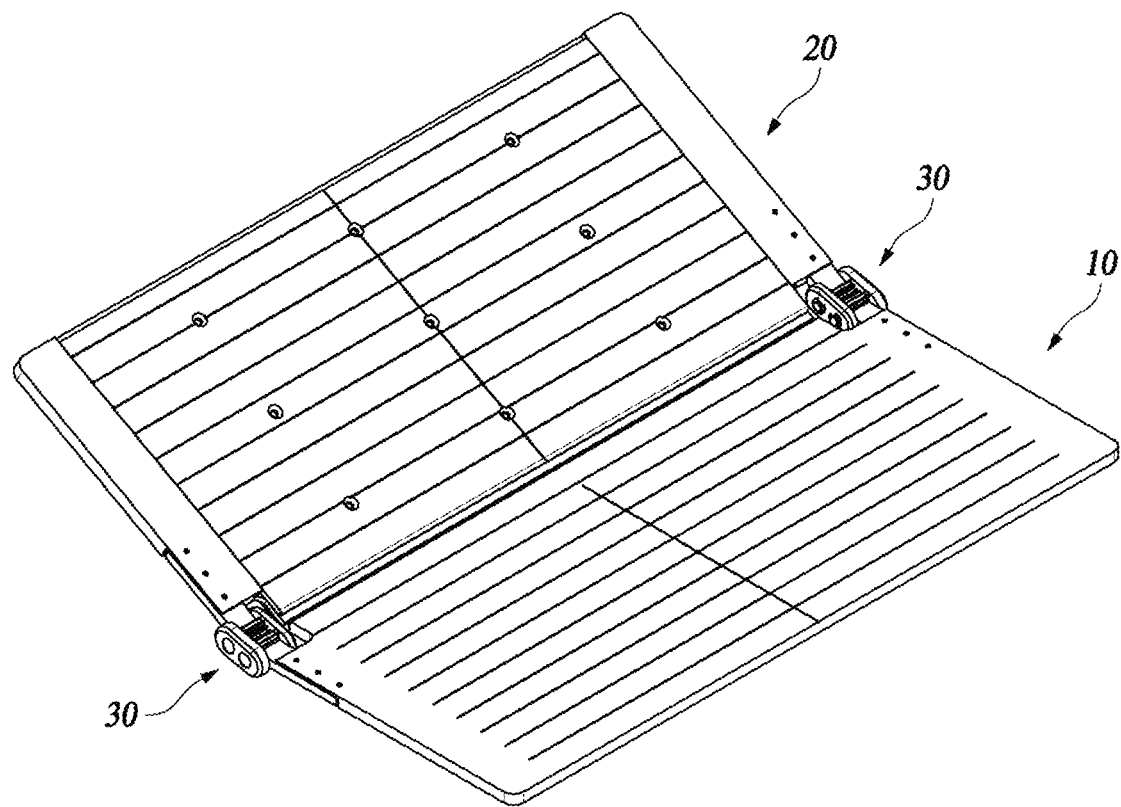
FIG. 1 is a perspective view showing a 360 degree folding jig according to an embodiment of the present disclosure.
Figure 2:
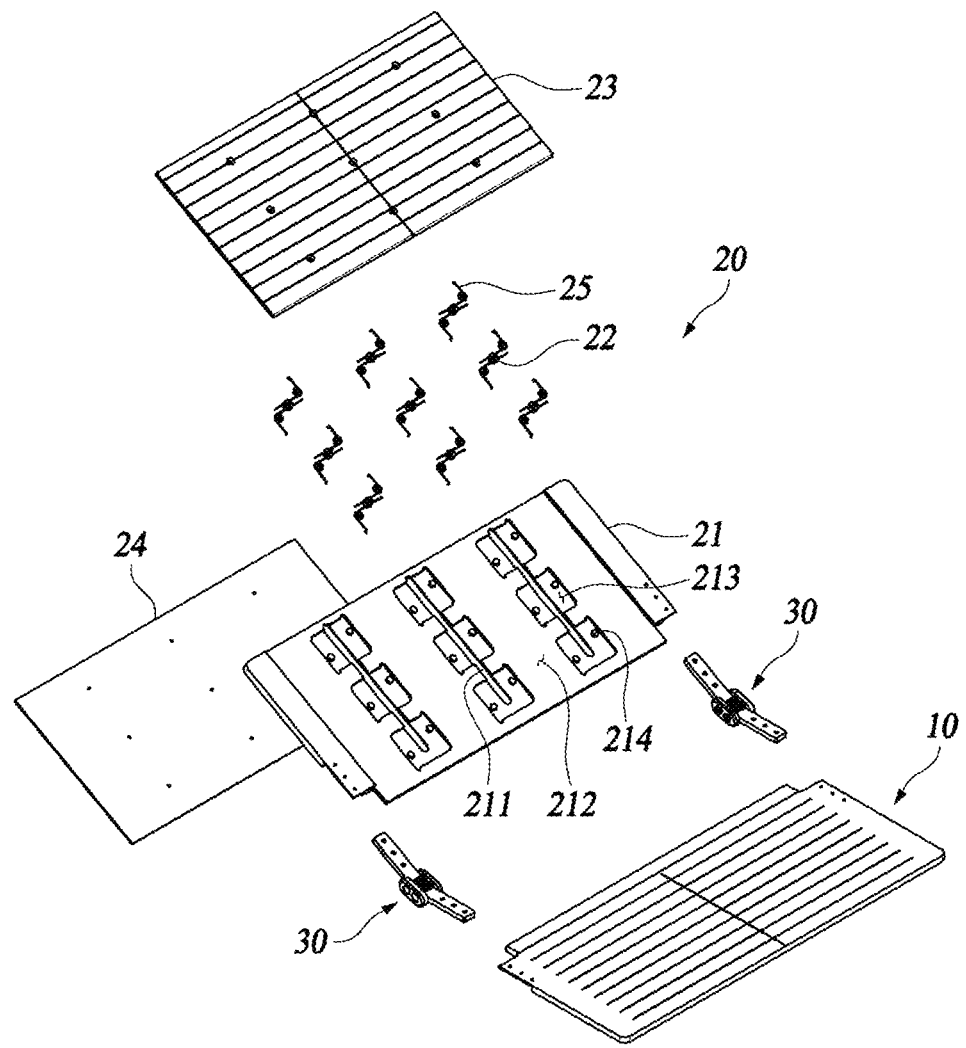
FIG. 2 is an exploded perspective view of FIG. 1.
Figure 3:
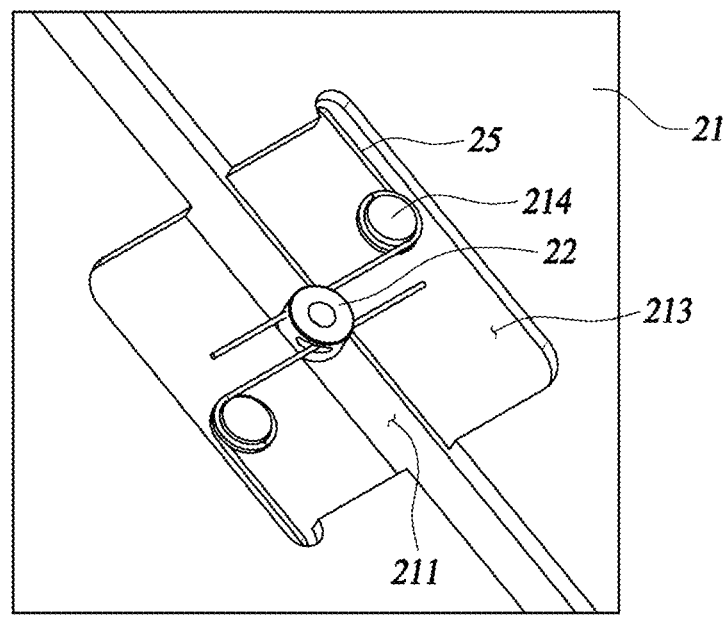
FIG. 3 is an enlarged view showing the coupling state of a reciprocating slider of a folding plate module in the 360 degree folding jig according to the embodiment of the present disclosure.
Figure 4:
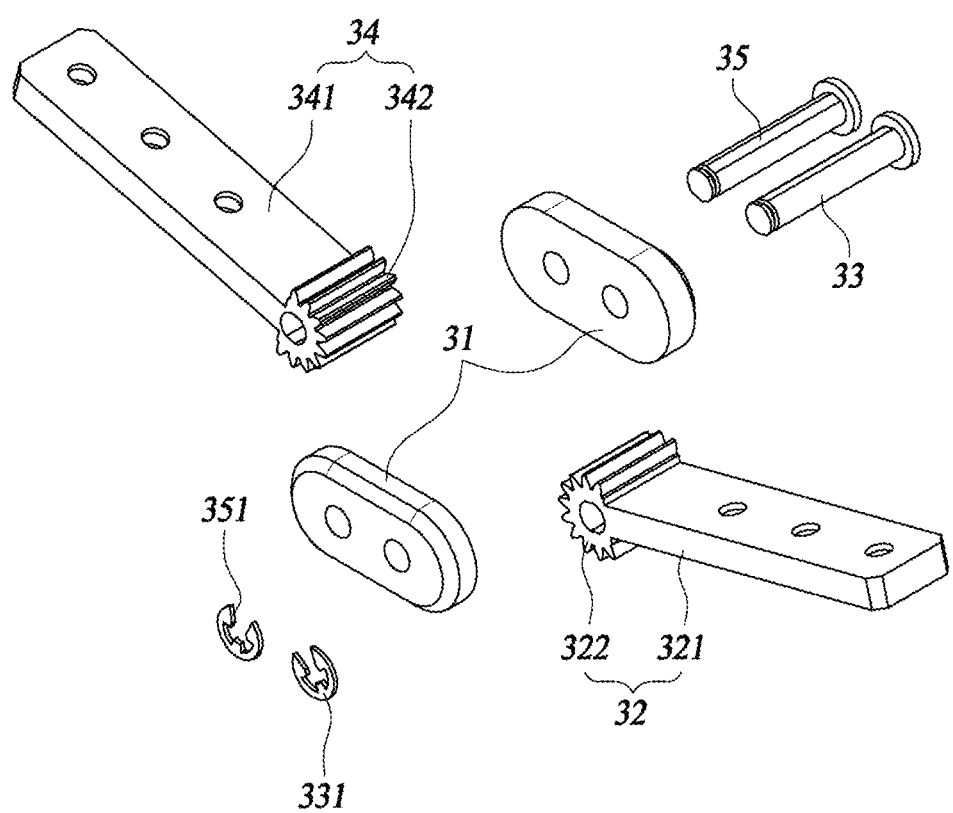
FIG. 4 is an exploded perspective view showing a rotation support module in the 360 degree folding jig according to the embodiment of the present disclosure.

Hereinafter, an embodiment of a 360 degree folding jig of the present disclosure will be described with reference to the accompanying drawings. At this time, the present disclosure is not limited by the embodiment. In addition, in describing the present disclosure, detailed descriptions of well-known functions or configurations may be omitted in order to clarify the gist of the present disclosure.

Referring to FIGS. 1 to 7, a 360 degree folding jig according to the present disclosure may include: a fixed plate module 10, a folding plate module 20, and a rotation support module 30.

One side of a sample S is supported on the fixed plate module 10.

A fixed mounting part for coupling with the rotation support module 30 may be provided at each end of the fixed plate module 10 facing the folding plate module 20.

The folding plate module 20 is spaced apart from the fixed plate module 10. The other side of the sample S is supported on the folding plate module 20 to be reciprocally movable.

The folding plate module 20 may include: a guide panel 21 spaced apart from the fixed plate module 10; a reciprocating slider 22 arranged to be reciprocally movable on the guide panel 21; a reciprocating member 23 coupled to the reciprocating slider 22 from one side of the guide panel 21 to support the other side of the sample S; and a reciprocating support member 24 coupled to the reciprocating slider 22 from the other side of the guide panel 21.

The folding plate module 20 may further include an elastic member 25 for elastically decompressing the reciprocating slider 22 to the front of the moving direction on the basis of the guide panel 21, while elastically decompressing the reciprocating slider 22 to the rear of the moving direction on the basis of the guide panel 21.

A folding mounting part for coupling with the rotation support module 30 may be provided at each end of the guide panel 21 facing the fixed plate module 10.

The guide panel 21 may be provided with a reciprocating guide 211 along a moving direction perpendicular to an imaginary line connecting a pair of rotation support modules 30. The reciprocating guide 211 may be formed to elongate along the moving direction. The reciprocating slider 22 may be inserted into the reciprocating guide 211 to reciprocate along the moving direction.

The guide panel 21 may be provided with a guide seating part 212 corresponding to the reciprocating member 23 and the reciprocating support member 24. In the embodiment of the present disclosure, the guide seating part 212 represents a groove shape in which the plate-shaped reciprocating member 23 and the plate-shaped reciprocating support member 24 are seated, but is not limited thereto. Since the guide seating part 212 is variously deformed corresponding to the shapes of the reciprocating member 23 and the reciprocating support member 24, the reciprocating member 23 and the reciprocating support member 24 may be stably reciprocated while being supported by the guide seating part 212. The guide seating part 212 may be divided into an upper seating part on which the reciprocating member 23 is supported so as to be reciprocally moved along the moving direction and a lower seating part on which the reciprocating support member 24 is supported so as to be reciprocally moved along the moving direction.

A member seating part 213 on which the elastic member 25 is movably seated may be formed recessed in the guide panel 21. The member seating part 213 may be provided on one side or both sides of the reciprocating guide 211. The member seating part 213 may be provided with an elastic joint part 214 on which the elastic member 25 is supported. The elastic joint part 214 may be variously deformed according to the shape of the elastic member 25.

The reciprocating slider 22 is reciprocally coupled to the reciprocating guide 211.

The reciprocating slider 22 is provided with a reciprocating wing support portion on which a wing portion of the elastic member 25 is supported, so that an elastic wing portion of the elastic member 25 is stably supported by the reciprocating slider 22, and it is possible to prevent the wing portion of the elastic member 25 from being separated from the reciprocating slider 22.

Although the reciprocating member 23 is shown as representing a plate shape, it is not limited thereto, and various shapes such as a bar shape are possible. In addition, the reciprocating member 23 is capable of smoothly reciprocating in the guide panel 21 while stably supporting the sample S on one side of the guide panel 21.

Although the reciprocating support member 24 is shown as representing a plate shape, it is not limited thereto, and various shapes such as a bar shape are possible. In addition, the reciprocating support member 24 is capable of smoothly reciprocating in the guide panel 21 on the other side of the guide panel 21.

The elastic member 25 has elastic force and elastically decompresses the reciprocating slider 22 with respect to the guide panel 21. The elastic member 25 may include: a first member for elastically decompressing the reciprocating slider 22 to the front of the moving direction on the basis of the guide panel 21; and a second member for elastically decompressing the reciprocating slider 22 to the rear of the moving direction on the basis of the guide panel 21.

In the embodiment of the present disclosure, the elastic member 25 may include: a coil portion coupled to the elastic joint part 214 with elasticity; a fixed wing portion extending from the coil portion and coupled to the elastic support portion provided in the member seating part 213; and an elastic wing portion extending from the coil portion in a state spaced apart from the fixed wing portion and supported by the reciprocating wing support portion of the reciprocating slider 22.

A pair of rotation support modules 30 are respectively provided at each end of the mutually adjacent fixed plate module 10 and the folding plate module 20. The rotation support modules 30 couple the folding plate module 20 to the fixed plate module 10 so that the folding plate module is in-folded or out-folded.

At this time, the rotation support module 30 may be provided with: a first shaft forming an axis of rotation of the folding plate module 20 based on the rotation support module; and a second shaft that is spaced apart from the first shaft toward the fixed plate module 10 and forms an axis of rotation of the rotation support module 30 based on the fixed plate module 10.

Then, when the folding plate module 20 is in-folded or out-folded on the basis of the fixed plate module 10, the rotation support module 30 rotates on the basis of the fixed plate module 10 in connection with the rotation of the folding plate module 20 based on the rotation support module 30, so that the elastic member 25 is elastically deformed according to the in-folding or out-folding action, and the reciprocating member 23 reciprocates in the guide panel 21 to realize the stress-free condition.

In addition, it is possible to perform 360 degree folding actions, including in-folding and out-folding actions, with a preset radius of curvature without additional jig deformation and setting.

If the radius of curvature of the sample S in the in-folding state is r, and the radius of curvature of the sample S in the out-folding state is R, the relationship of $r:R=1:6$ may be satisfied to stabilize in-folding and out-folding.

It is possible to adjust the distance between the fixed plate module 10 and the folding plate module 20 and the radius of curvature described above by replacing the rotation support module 30.

The rotation support module 30 may include: a mounting bracket 31 disposed at each end of the fixed plate module 10 and the folding plate module 20 adjacent to each other; a fixed support member 32 having one side coupled to the fixed plate module 10, and the other side rotatably coupled to the mounting bracket 31 with the second shaft as a medium; a fixed gear shaft 33 rotatably coupling the fixed support member 32 to the mounting bracket 31 to perform the second shaft; a folding support member 34 having one side coupled to the folding plate module 20, and the other side rotatably coupled to the mounting bracket 31 with the first shaft as a medium; and a folding gear shaft 35 rotatably coupling the folding support member 34 to the mounting bracket 31 to perform the first shaft.

The mounting bracket 31 may be composed of a pair of pad brackets spaced apart from each other as in an embodiment of the present disclosure. The mounting bracket 31 may be composed of a channel bracket having a "⊏" shape.

Since the fixed support member 32 is gear-coupled to the folding support member 34, a linkage action between the fixed plate module 10, the folding plate module 20, and the rotation support module 30 may be performed.

To be specific, the fixed support member 32 may include: a fixed joint part 321 coupled to the folding plate module 20; and a fixed gear part 322 provided at an end of the fixed joint part 321 and rotatably coupled to the mounting bracket 31 via the fixed gear shaft 33. In addition, the folding support member 34 may include: a folding joint part 341 coupled to the fixed plate module 10; and a folding gear part 342 provided at an end of the folding joint part 341 and rotatably coupled to the mounting bracket 31 via the folding gear shaft 35. Then, since fixed gear teeth are formed on the outer peripheral surface of the fixed gear part 322, and folding gear teeth that are gear-coupled to the fixed gear teeth are formed on the outer peripheral surface of the folding gear part 342, the fixed gear part 322 and the folding gear part 342 are gear-coupled to each other.

Unexplained reference numeral 331 is a fixed shaft support for coupling the fixed gear shaft 33 to the mounting bracket 31, and unexplained reference numeral 351 is a folding shaft support for coupling the folding gear shaft 35 to the mounting bracket 31.

An operation of the 360 degree folding jig according to an embodiment of the present disclosure will be described with reference to FIGS. 5 to 7.

In the folding action of the folding plate module 20 based on the fixed plate module 10, when the folding plate module 20 is moved, the folding plate module 20 rotates about the folding gear shaft 35 with respect to the mounting bracket 31, and through the linkage of the gear coupling, the mounting bracket 31 rotates about the fixed gear shaft 33 with respect to the fixed plate module 10. By rotating the folding plate module 20 based on the fixed plate module 10, it is possible to implement the 360 degree folding action of the sample S as well as the in-folding action and the out-folding action of the sample S.

Figure 5:
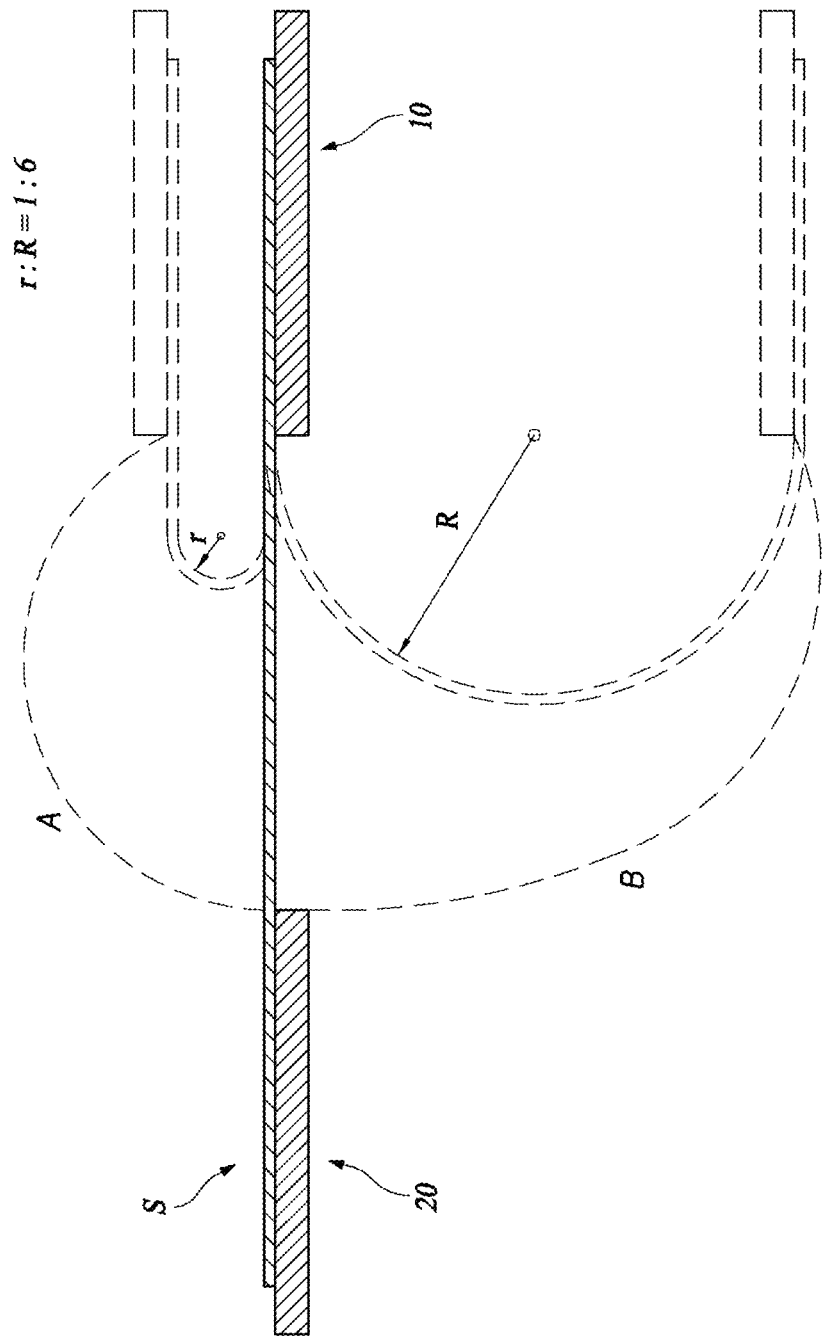
FIG. 5 is a view showing the trajectory of the folding plate module based on a fixed plate module in the 360 degree folding jig according to the embodiment of the present disclosure.
Figure 6:
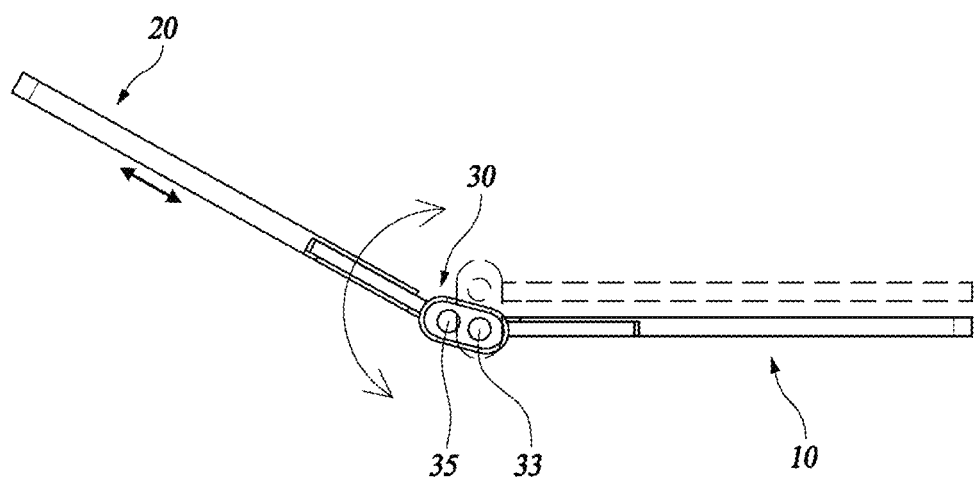
FIG. 6 is a view showing a process in which the folding plate module is in-folded based on the fixed plate module in the 360 degree folding jig according to the embodiment of the present disclosure.

Referring to FIGS. 5 and 6, in the folding action of the folding plate module 20 based on the fixed plate module 10, when the folding plate module 20 is moved, the folding support member 34 to which the folding plate module 20 is coupled rotates about the folding gear shaft 35 with respect to the mounting bracket 31, and as the gear coupling of the fixed gear part 322 and the folding gear part 342 is linked, the mounting bracket 31 rotates about the fixed gear shaft 33 with respect to the fixed support mem 32 to which the fixed plate module 10 is coupled.

When the in-folding action is completed, the sample S, which was in a horizontal state, is bent so that the radius of curvature represents r, and the bent sample S is disposed between the fixed plate module 10 and the folding plate module 20 facing each other.

Figure 7:
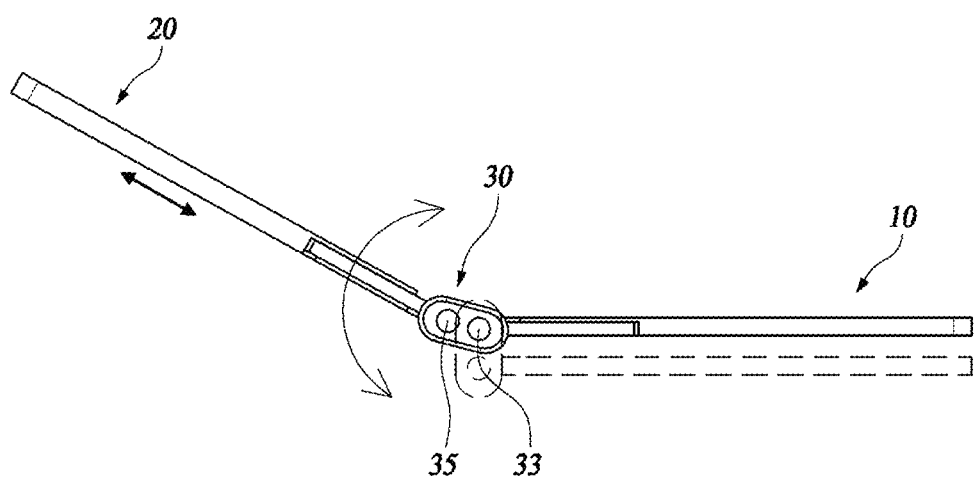
FIG. 7 is a view showing a process in which the folding plate module is out-folded based on the fixed plate module in the 360 degree folding jig according to the embodiment of the present disclosure.

Referring to FIGS. 5 and 7, in the out-folding action of the folding plate module 20 based on the fixed plate module 10, when the folding plate module 20 is moved, the folding support member 34 to which the folding plate module 20 is coupled rotates about the folding gear shaft 35 with respect to the mounting bracket 31, and as the gear coupling of the fixed gear part 322 and the folding gear part 342 is linked, the mounting bracket 31 rotates about the fixed gear shaft 33 with respect to the fixed support mem 32 to which the fixed plate module 10 is coupled.

When the out-folding action is completed, the sample S, which was in a horizontal state, is bent so that the radius of curvature represents r, and the bent sample S is disposed in a shape surrounding the fixed plate module 10 and the folding plate module 20 facing each other.

In response to the above-described folding actions, the mutually coupled reciprocating slider 22, reciprocating member 23, and reciprocating support member 24 reciprocate on the basis of the guide panel 21. Then, in the folding plate module 20, as the mutually coupled reciprocating slider 22, reciprocating member 23, and reciprocating support member 24 reciprocate in the guide panel 21, folding trajectories A and B are formed in the folding process. This folding trajectory forms an optimal path in which no stress is applied to the sample S. The folding trajectory may be divided into the first trajectory A according to the in-folding action and the second trajectory B according to the out-folding action.

When the mutually coupled reciprocating slider 22, reciprocating member 23, and reciprocating support member 24 reciprocate along the folding trajectory, no stress is applied to the sample S since the sample S flexibly moves in the guide panel 21 by relative motion. Therefore, the 360 degree folding jig according to the embodiment of the present disclosure implements the reciprocating structure described above in the above-described folding actions, and thus, the stress-free condition for the stress acting on the sample S may be realized. However, when the mutually coupled reciprocating slider 22, reciprocating member 23, and reciprocating support member 24 do not reciprocate in the guide panel 21, the folding trajectory may not be formed in the above-described folding action. Accordingly, the sample S may be pressurized or stretched, and the folding action is made in a state in which the stress is applied to the sample S, which makes a test for the sample S inaccurate.

Meanwhile, as the mutually coupled reciprocating slider 22, reciprocating member 23, and reciprocating support member 24 reciprocate on the basis of the guide panel 21, the elastic members 25 each of which supported at the front and rear of the reciprocating slider 22 are elastically deformed. Then, by the interaction of the elastic members 25 each of which supported at the front and rear of the reciprocating slider 22, the reciprocating movement of the reciprocating slider 22 in the reciprocating guide 211 provided on the guide panel 21 may be facilitated, thereby preventing stress from acting on the sample S. To sum up, the 360 degree folding jig according to the embodiment of the present disclosure implements the reciprocating structure and elastic support structure described above in the above-described folding actions, therefore, it is possible to realize the stress-free condition for the stress acting on the sample S.

According to the above-described 360 degree folding jig, when performing a durability test of the sample S, it is possible to perform actions similar to those of a product to which the sample S is applied.

In addition, the 360 degree folding jig of the present disclosure can clearly perform an in-folding action, an out-folding action, and a 360 degree folding action through the interconnected rotation action between the fixed plate module 10, the folding plate module 20, and the rotation support module 30.

Furthermore, the 360 degree folding jig of the present disclosure can facilitate the reciprocating motion of the reciprocating slider 22, the reciprocating member 23, and the reciprocating support member 24 based on the guide panel 21 through the detailed coupling relationship of the folding plate module 20. Also, stress-free condition can be realized for the stress acting on the sample.

Moreover, the 360 degree folding jig of the present disclosure ensures smooth reciprocating motion of the reciprocating slider 22, the reciprocating member 23, and the reciprocating support member 24 based on the guide panel 21 through the additional coupling relationship of the elastic member 25, and realizes stress-free condition for the stress acting on the sample.

In addition, the 360 degree folding jig of the present disclosure can stably guide the reciprocating motion of the reciprocating member 23 and the reciprocating support member 24 in the guide panel 21 through the guide seating part 212, and can minimize the movement of the reciprocating member 23 and the reciprocating support 24 member in the guide panel 21.

Furthermore, the 360 degree folding jig of the present disclosure can prevent the elastic member 25 from being interfered with the reciprocating member 23 and the reciprocating support member 24 by using the member seating part 213.

Moreover, the 360 degree folding jig of the present disclosure can position the elastic member 25 in the guide panel 21 by using the elastic joint part 214.

In addition, the 360 degree folding jig of the present disclosure can clarify the mutual linkage action between the fixed plate module 10, the folding plate module 20, and the rotation support module 30 through the detailed coupling relationship of the rotation support module 30, and can realize stress-free condition for the stress acting on the sample.

Furthermore, the 360 degree folding jig of the present disclosure can clearly perform the linked rotation action of the rotation support module 30 and the folding plate module 20 based on the fixed plate module 10 through the gear coupling structure between the fixed support member 32 and the folding support member 34.

Moreover, the 360 degree folding jig of the present disclosure can stably couple the fixed gear shaft 33 to the mounting bracket 31 by using the fixed shaft support 331, and prevent the fixed gear shaft 33 from being separated from the mounting bracket 31.

Furthermore, the 360 degree folding jig of the present disclosure can stably couple the folding gear shaft 35 to the mounting bracket 31 by using the folding shaft support 351, and prevent the folding gear shaft 35 from being separated from the mounting bracket 31.

As described above, the preferred embodiment of the present disclosure has been described with reference to the drawings, however, various modifications or changes may be made to the present disclosure by those skilled in the art without departing from the spirit and scope of the present disclosure as set forth in the following claims.

What is claimed is:

1. A folding jig, comprising:
    a fixed plate module on which a first side of a sample is supported;
    a folding plate module that is spaced apart from the fixed plate module and on which a second side of the sample is supported such that the second side of the sample is capable of being in-folded and out-folded with respect to the first side of the sample; and
    a pair of rotation support modules respectively provided at each end of the mutually adjacent fixed plate module and the folding plate module, and configured to couple the folding plate module to the fixed plate module so that the folding plate module is in-folded or out-folded,
    wherein the rotation support modules include:
        a first shaft forming an axis of rotation of the folding plate module with respect to the rotation support modules; and
        a second shaft that is spaced apart from the first shaft toward the fixed plate module and forms an axis of rotation of the rotation support modules with respect to the fixed plate module,
    wherein the rotation support modules rotate with respect to the fixed plate module in connection with a rotation of the folding plate module with respect to the rotation support modules when the folding plate module is in-folded or out-folded with respect to the fixed plate module, and
    wherein the folding plate module comprises:
        a guide panel to which the rotation support modules are coupled at each end in a state spaced apart from the fixed plate module, wherein the guide panel includes a reciprocating guide formed along a moving direction perpendicular to an imaginary line connecting the pair of rotation support modules;
        a reciprocating slider arranged to be reciprocally movable on the reciprocating guide;
        a reciprocating member coupled to the reciprocating slider from a first side of the guide panel and supporting the second side of the sample; and
        a reciprocating support member coupled to the reciprocating slider from a second side of the guide panel.

2. The folding jig of claim 1, wherein the folding plate module further comprises:
    an elastic member configured to be elastically compressed in response to the reciprocating slider being moved to either a front or a rear along the moving direction with respect to the guide panel.

3. The folding jig of claim 2, wherein in the guide panel, a member seating part on which the elastic member is movably seated is formed as a recess.

4. The folding jig of claim 1, wherein each of the rotation support modules comprises:
    a mounting bracket disposed at each end of the fixed plate module and the folding plate module adjacent to each other;
    a fixed support member having a first side coupled to the fixed plate module, and a second side rotatably coupled to the mounting bracket via the second shaft;
    a fixed gear shaft rotatably coupling the fixed support member to the mounting bracket to function as the second shaft;
    a folding support member having a first side coupled to the folding plate module, and a second side rotatably coupled to the mounting bracket via the first shaft; and
    a folding gear shaft rotatably coupling the folding support member to the mounting bracket to function as the first shaft,
    wherein the fixed support member is gear-coupled to the folding support member.

5. The folding jig of claim 4, wherein the fixed support member comprises:
    a fixed joint part coupled to the fixed plate module; and
    a fixed gear part provided at an end of the fixed joint part and rotatably coupled to the mounting bracket via the fixed gear shaft, and
    wherein the folding support member comprises:
    a folding joint part coupled to the folding plate module; and
    a folding gear part provided at an end of the folding joint part and rotatably coupled to the mounting bracket via the folding gear shaft, and
    wherein the fixed gear part and the folding gear part are mutually gear-coupled.

\* \* \* \* \*